(12) United States Patent
Yao et al.

(10) Patent No.: US 9,318,911 B2
(45) Date of Patent: Apr. 19, 2016

(54) SELF-ADAPTIVE INPUT POWER CHARGER AND METHOD FOR CONTROLLING INPUT CURRENT OF CHARGER

(71) Applicant: Silergy Semiconductor Technology (Hangzhou) LTD, Hangzhou, ZheJiang Province (CN)

(72) Inventors: Jie Yao, Hangzhou (CN); Wei Chen, Saratoga, CA (US); Chen Zhao, Hangzhou (CN); Shuai Cheng, Hangzhou (CN)

(73) Assignee: (A) Silergy Semiconductor Technology (Hangzhou) LTD, Hangzhou (CN)

( * ) Notice: Subject to any disclaimer, the term of this patent is extended or adjusted under 35 U.S.C. 154(b) by 190 days.

(21) Appl. No.: 14/073,052

(22) Filed: Nov. 6, 2013

(65) Prior Publication Data
US 2014/0152239 A1 Jun. 5, 2014

(30) Foreign Application Priority Data

Nov. 30, 2012 (CN) .......................... 2012 1 0516649

(51) Int. Cl.
*H02J 7/00* (2006.01)
(52) U.S. Cl.
CPC ............. *H02J 7/0081* (2013.01); *H02J 7/0083* (2013.01); *H02J 7/0093* (2013.01)
(58) Field of Classification Search
CPC ................................ H02J 7/0068; H02J 7/245
USPC ............................................................ 320/107
See application file for complete search history.

(56) References Cited

U.S. PATENT DOCUMENTS

| | | | |
|---|---|---|---|
| 8,723,490 B2 * | 5/2014 | Moussaoui et al. ........... | 323/259 |
| 2005/0135133 A1 * | 6/2005 | Maehara ........................ | 363/144 |
| 2009/0108677 A1 * | 4/2009 | Walter et al. ..................... | 307/80 |
| 2010/0052611 A1 * | 3/2010 | Lyle, Jr. .......................... | 320/111 |
| 2011/0133700 A1 * | 6/2011 | Martin et al. .................. | 320/145 |
| 2012/0195075 A1 * | 8/2012 | Nate ........................... | 363/21.01 |
| 2013/0113415 A1 * | 5/2013 | Chen et al. ..................... | 320/107 |
| 2013/0234677 A1 * | 9/2013 | Mok et al. ...................... | 320/164 |
| 2013/0288731 A1 * | 10/2013 | Chu ............................... | 455/509 |
| 2014/0145504 A1 * | 5/2014 | Kayama .......................... | 307/23 |
| 2014/0203763 A1 * | 7/2014 | Zhao et al. ..................... | 320/107 |
| 2014/0210400 A1 * | 7/2014 | Goncalves et al. ............ | 320/107 |

* cited by examiner

*Primary Examiner* — Suchin Parihar
(74) *Attorney, Agent, or Firm* — Michael C. Stephens, Jr.

(57) ABSTRACT

Disclosed herein are circuits and methods for limiting a charger input current. In one embodiment, a self-adaptive input power charger for charging a battery, can include: (i) a power stage circuit configured to receive an external input power supply that supplies an input voltage and an input current to the charger; (ii) a comparison circuit configured to generate a comparison result indicating that the input power supply has entered a current-limiting state when the input voltage is less than a first reference voltage; (iii) a current regulation circuit configured to generate a first control signal in response to the comparison result; and (iv) a driving control circuit configured to limit the input current by the first control signal.

15 Claims, 9 Drawing Sheets

SELF-ADAPTIVE INPUT POWER CHARGER AND METHOD FOR CONTROLLING INPUT CURRENT OF CHARGER

RELATED APPLICATIONS

This application claims the benefit of Chinese Patent Application No. 201210516649.X, filed on Nov. 30, 2012, which is incorporated herein by reference in its entirety.

FIELD OF THE INVENTION

The present invention relates to the field of power supplies, and more particularly to circuits and methods for controlling an input current of a charger.

BACKGROUND

Switching type chargers are widely used in smart phones and tablet computers due to their relatively small size, high efficiency, and fast charging speeds for charging a battery. An external input power supply (e.g., an adapter, USB interface, etc.) for the charger usually has limitations on its output power and output current. When the charging current of a charger is too high, the input power supply may enter a current-limiting state, which can possibly result in abnormal charger operation.

SUMMARY

In one embodiment, a self-adaptive input power charger for charging a battery, can include: (i) a power stage circuit configured to receive an external input power supply that supplies an input voltage and an input current to the charger; (ii) a comparison circuit configured to generate a comparison result indicating that the input power supply has entered a current-limiting state when the input voltage is less than a first reference voltage; (iii) a current regulation circuit configured to generate a first control signal in response to the comparison result; and (iv) a driving control circuit configured to limit the input current by the first control signal.

In one embodiment, a method can include: (i) receiving, by a power stage circuit, an external input power supply that supplies an input voltage and an input current to a charger for charging a battery; (ii) generating, by a comparison circuit, a comparison result indicating that the input power supply has entered a current-limiting state when the input voltage is less than a first reference voltage; (iii) generating, by a current regulation circuit, a first control signal in response to the comparison result; and (iv) limiting, by a driving control circuit, the input current using the first control signal.

Embodiments of the present invention can provide several advantages over conventional approaches, as may become readily apparent from the detailed description of various embodiments below.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
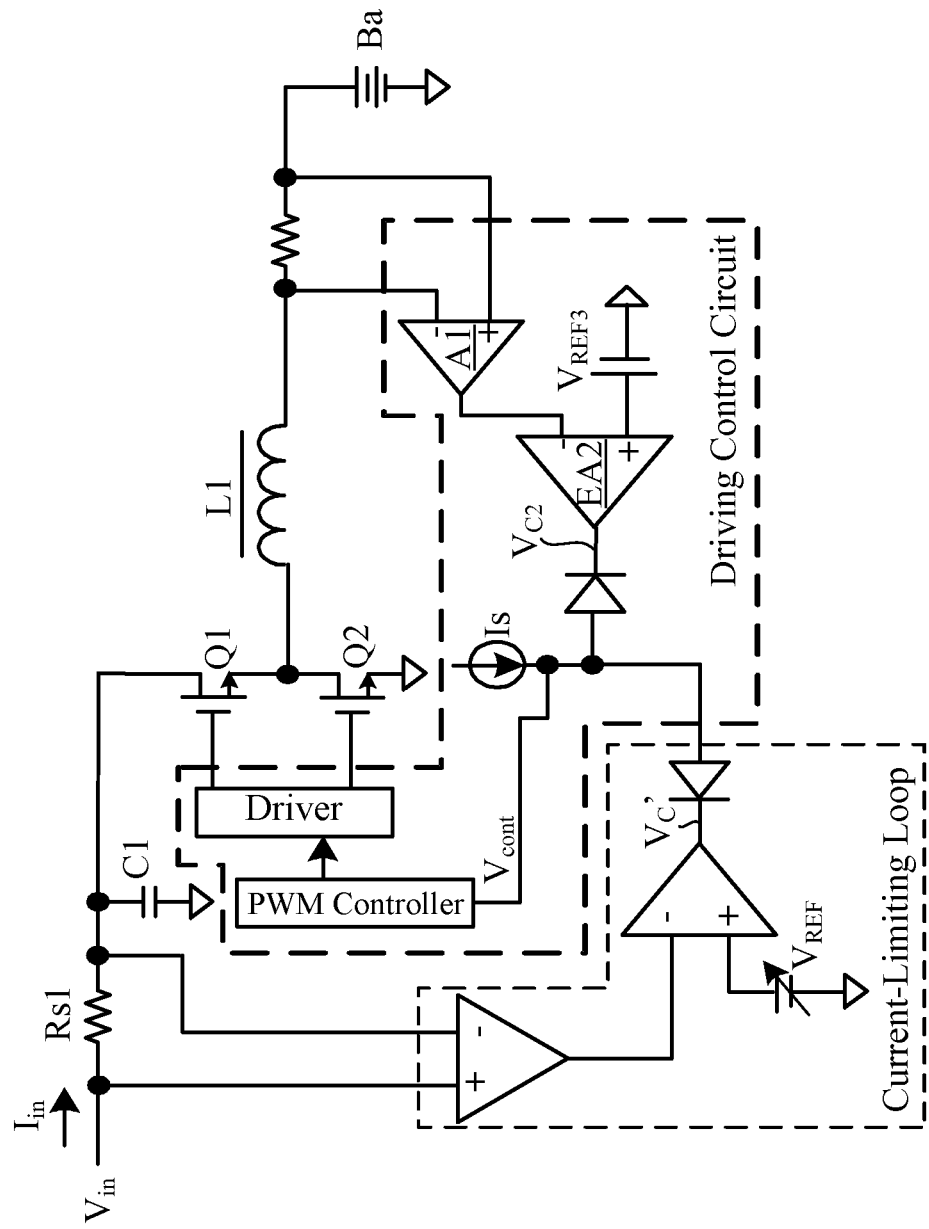
FIG. 1 is a schematic block diagram of an example switching type charger.

Referring now to FIG. 1, shown is a schematic block diagram of an example switching type charger. In this example, a power stage circuit can be configured as a bi-directional DC converter for charging battery Ba (e.g., a lithium battery). However, other types of power stage circuits and batteries or devices to be charged can be accommodated in particular embodiments. The switching type charger can include a driving control circuit, which can include a current control loop, a pulse-width modulation (PWM) controller, and a driver. The driving control circuit can be configured to control a power switch in the power stage circuit to control a charging current of the charger. The switching type charger can also include a current-limiting loop for regulating an input current of the charger.

In this example, the charger can detect input current $I_{in}$ through sense resistor Rs1, and may compare the sense result against input current-limiting reference voltage $V_{REF}$ to obtain error signal $V_C'$. If the sensed input current reaches a level of input current-limiting reference voltage $V_{REF}$, error signal $V_C'$ may decrease, and the PWM controller may utilize control signal $V_{cont}$ to reduce the charging current of the charger, thereby reducing the input current of the charger. However, at least one sense resistor (e.g., Rs1) or resistive component may be needed to detect the input current, possibly increasing power losses. Also, because the input current-limiting reference voltage may be set based on the output power of the input power supply, the system with the charger may need a corresponding detection circuit in order to detect the input power type for setting the corresponding input current-limiting voltage reference, thus potentially increasing product costs.

In one embodiment, a self-adaptive input power charger for charging a battery, can include: (i) a power stage circuit configured to receive an external input power supply that supplies an input voltage and an input current to the charger; (ii) a comparison circuit configured to generate a comparison result indicating that the input power supply has entered a current-limiting state when the input voltage is less than a first reference voltage; (iii) a current regulation circuit configured to generate a first control signal in response to the comparison result; and (iv) a driving control circuit configured to limit the input current by the first control signal.

Figure 2:
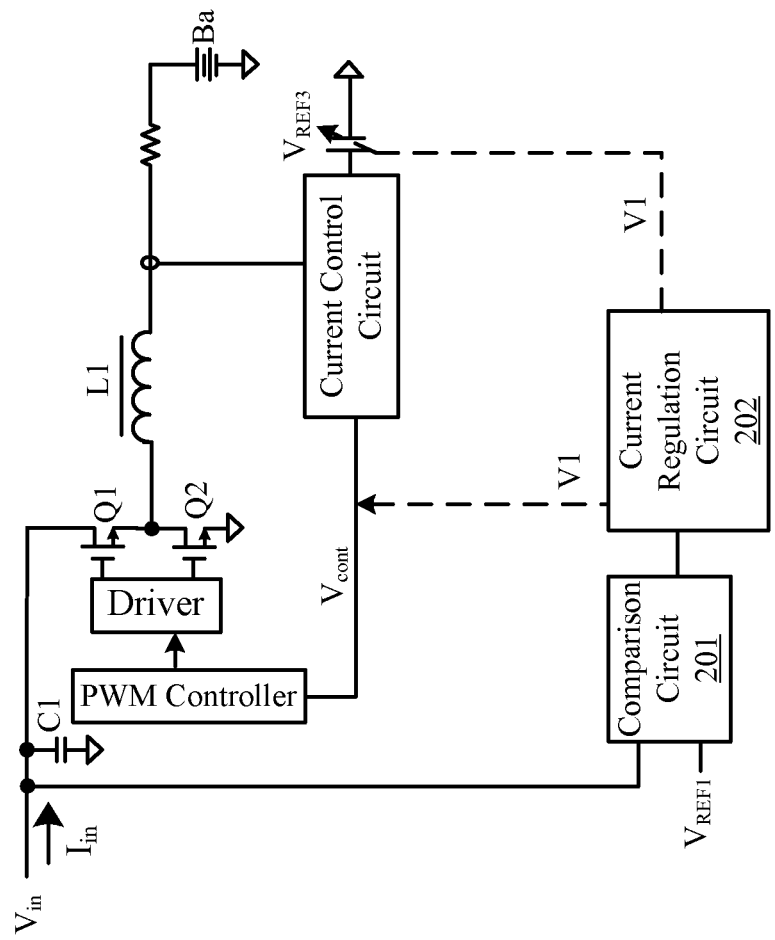
FIG. 2 is a schematic block diagram of an example charger in accordance with embodiments of the present invention.

Referring now to FIG. 2, shown is a schematic block diagram of an example self-adaptive input power charger in accordance with embodiments of the present invention. The charger can include a power stage circuit and a driving control circuit. In this particular example, the power stage circuit can be configured as a bi-directional DC converter including capacitor C1, power switch Q1, power switch Q2, and inductor L1. When an input power supply is present, the power stage circuit can operate in a Buck converter mode to charge lithium battery Ba. A Buck converter mode can involve step down DC to DC voltage conversion in a switch mode power supply configuration. In this case, a single inductor L1 is utilized, with power switches Q1 and Q2, as controlled by the PWM controller. Particular embodiments can also support any suitable power stage or converter topology.

The charger can also include comparison circuit 201 and current regulation circuit 202. Comparison circuit 201 can compare input voltage $V_{in}$ of the charger against reference voltage $V_{REF1}$, and may generate a comparison result therefrom. In some cases, reference voltage $V_{REF1}$ can be self-adapted and/or user programmable based on an input voltage of the charger. Generally, reference voltage $V_{REF1}$ can be set to a lowest allowable input voltage when the external input power supply is not in an input current-limiting state. For example, reference voltage $V_{REF1}$ can be set to slightly less than such a lowest allowable input voltage in order to ensure that the input power supply can output a maximum power for the charger during normal (e.g., non current-limiting) operation. In other cases, reference voltage $V_{REF1}$ can be set to a lowest voltage based on the input voltage during a current-limiting state.

Current regulation circuit 202, along with comparison circuit 201, can determine whether the input power supply enters a current-limiting state in accordance with the comparison result. When the input voltage is less than reference voltage $V_{REF1}$, the input power supply may be considered to have entered the current-limiting state. In this case, current regulation circuit 202 can generate control signal V1 based on the comparison result. The driving control circuitry can then utilize control signal V1 to limit a charging current of the charger via power switches Q1 and Q2, thereby limiting input current $I_{in}$ of the charger.

In this example, control signal V1 can be configured to regulate control signal $V_{cont}$ of the PWM controller to control duty cycles of power switches Q1 and Q2 to limit input current $I_{in}$ of the charger. In addition, control signal V1 can also be configured to regulate voltage reference $V_{REF3}$, which is a voltage reference level for the current control loop. For example, a voltage reference for the current control loop can be decreased in order to limit input current $I_{in}$, and the charging current, of the charger. In this way, the input current of the charger can be limited without having to use a sense resistor to detect the input current, thereby reducing losses such a sense resistor, as well as product costs due to associated detection circuitry.

Figure 3A:
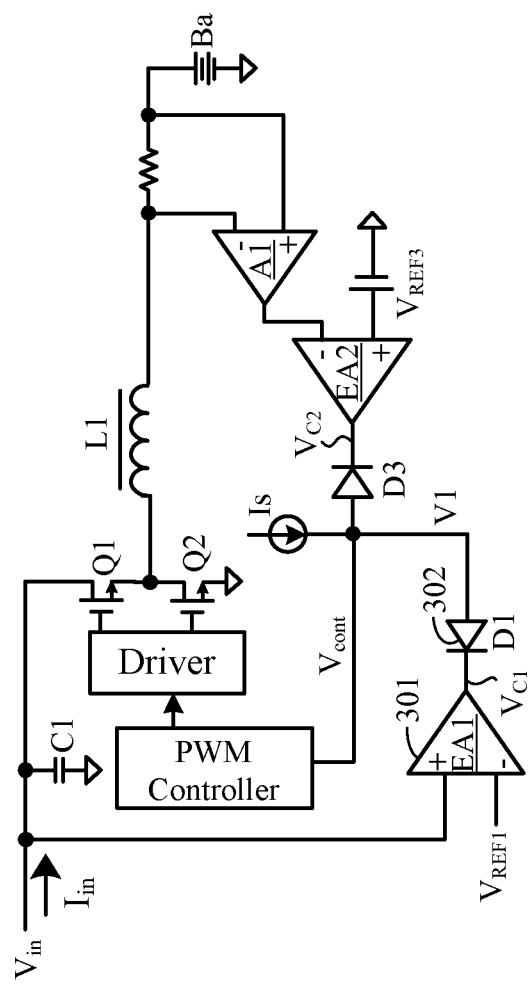
FIG. 3A is a schematic block diagram of a first example self-adaptive input power charger in accordance with embodiments of the present invention.

Referring now to FIG. 3A, shown is a schematic block diagram of a first example self-adaptive input power charger in accordance with embodiments of the present invention. In this example, comparison circuit 301 can include error amplifier EA1 with a non-inverting input terminal that can connect to input voltage an inverting input terminal that can connect reference voltage $V_{REF1}$, and an output terminal that can output error signal $V_{C1}$ as the comparison result. Current regulation circuit 302 can include diode D1 with a cathode that can connect to the output terminal of error amplifier EA1, and an anode that can connect with the current control loop and the current regulation circuit. In this particular example, when diode D1 is on, an error signal can be configured as control signal V1. For example, control signal V1 may be diode drop above comparison result or error signal $V_{C1}$. The PWM controller can utilize the lower of error signals $V_{C1}$ and $V_{C2}$, which can turn on corresponding diode D1 or D3, as control signal $V_{cont}$.

When input voltage $V_{in}$ is less than reference voltage $V_{REF1}$ indicating that the input power supply is in a current-limiting state, error signal $W_{C1}$ may decrease and diode D1 can turn on. In this case, the PWM controller can utilize error signal $V_{C1}$ as control signal $V_{cont}$, to accordingly control duty cycles of power switches Q1 and Q2. For example, the PWM controller can be configured to reduce the duty cycle (e.g., switch on time per cycle) of power switch Q1 during the current-limiting state, thereby also reducing the charging current of the charger. Correspondingly, input current $I_{in}$ of the charger may decrease until input voltage $V_{in}$ is almost equal to reference voltage $V_{REF1}$, which can ensure a return (e.g., from the current-limiting state) to normal operation of the charger.

In this example, the current regulation circuit can effectively transmit or otherwise provide control signal V1 to the PWM controller (e.g., via error signal $V_{C1}$ through diode D1). Control signal V1 can effectively be used to control the duty cycle of power switch Q1 in the power stage circuit via control signal $V_{cont}$ of the PWM controller. Thus, changes in a voltage level of control signal V1 can be reflected in corresponding duty cycle (e.g., switch on/off times per cycle) changes of power switch Q1 of the power stage circuit. In this way, current-limiting of the input current of the charger can be achieved based on detection of an input power supply current-limiting state versus normal operation.

Figure 3B:
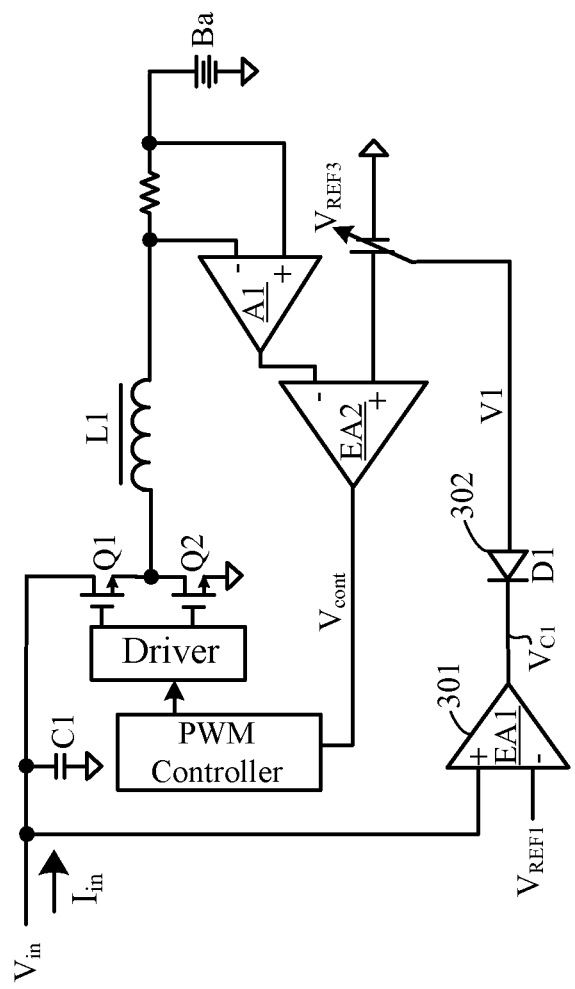
FIG. 3B is a schematic block diagram of a second example self-adaptive input power charger in accordance with embodiments of the present invention.

Referring now to FIG. 3B, shown is a schematic block diagram of a second example self-adaptive input power charger in accordance with embodiments of the present invention. Here, comparison circuit 301 can be the same as, or similar to, that discussed above with reference to FIG. 3A. However, in the example of FIG. 3B, the anode of diode D1 in current regulation circuit 302 can be coupled with the input terminal of voltage reference $V_{REF3}$ for the current control loop. Similarly, when diode D1 is on, error signal $V_{C1}$ can be configured (e.g., by way of a diode drop) as control signal V1.

In this example, when input voltage is less than reference voltage $V_{REF1}$, the input power supply may be in a current-limiting state. In this case, error signal $V_{C1}$ may decrease and diode D1 can turn on. Diode D1 can be configured to transmit or otherwise provide error signal $V_{C1}$ via control signal V1 to the current control loop in the driving control circuit. For example, error signal $V_{C1}$ can pass via diode D1 and control signal V1 to an input or control terminal of voltage reference $V_{REF3}$ for the current control loop. Because control signal V1 can be used to adjust (or may be configured as) voltage reference $V_{REF3}$, voltage reference $V_{REF3}$ can also decrease along with control signal V1 during the current-limiting state. Correspondingly, the current control loop can be configured to control the duty cycle of power switch Q1, such as by reducing the on time of power switch Q1 per cycle, to reduce the charging current of lithium battery Ba, and to thereby decrease input current $I_{in}$, of the charger.

Accordingly, a current regulation circuit can effectively transmit or otherwise provide control signal V1 to the PWM controller (e.g., via error signal $V_{C1}$ through diode D1). Control signal V1 can be used to regulate (or be configured as) voltage reference $V_{REF3}$ for the current regulation loop, and this can be reflected in corresponding duty cycle (e.g., switch on/off times per cycle) changes of power switch Q1 of the power stage circuit. In this way, current-limiting of the input current of the charger can be achieved based on detection of an input power supply current-limiting state versus normal operation.

In particular embodiments, charger input current can be limited without use of a sense resistor to detect the input current. Rather, the input voltage can be compared against a reference voltage (e.g., $V_{REF1}$) to determine a current-limiting operation state (or normal operation) of the input power supply. The charging current of the charger can be regulated based on this comparison result to achieve input current-limiting of the charger, and to return from an input current-limiting state to normal operation of the input power supply. In these examples, the reference voltage (e.g., $V_{REF1}$) can be set based on a lowest allowable input voltage when in normal operation (e.g., not in an input current-limiting state). Therefore, the reference voltage can be adapted to different input voltages and/or power supplies by adjusting the level of the reference voltage.

Figure 4:
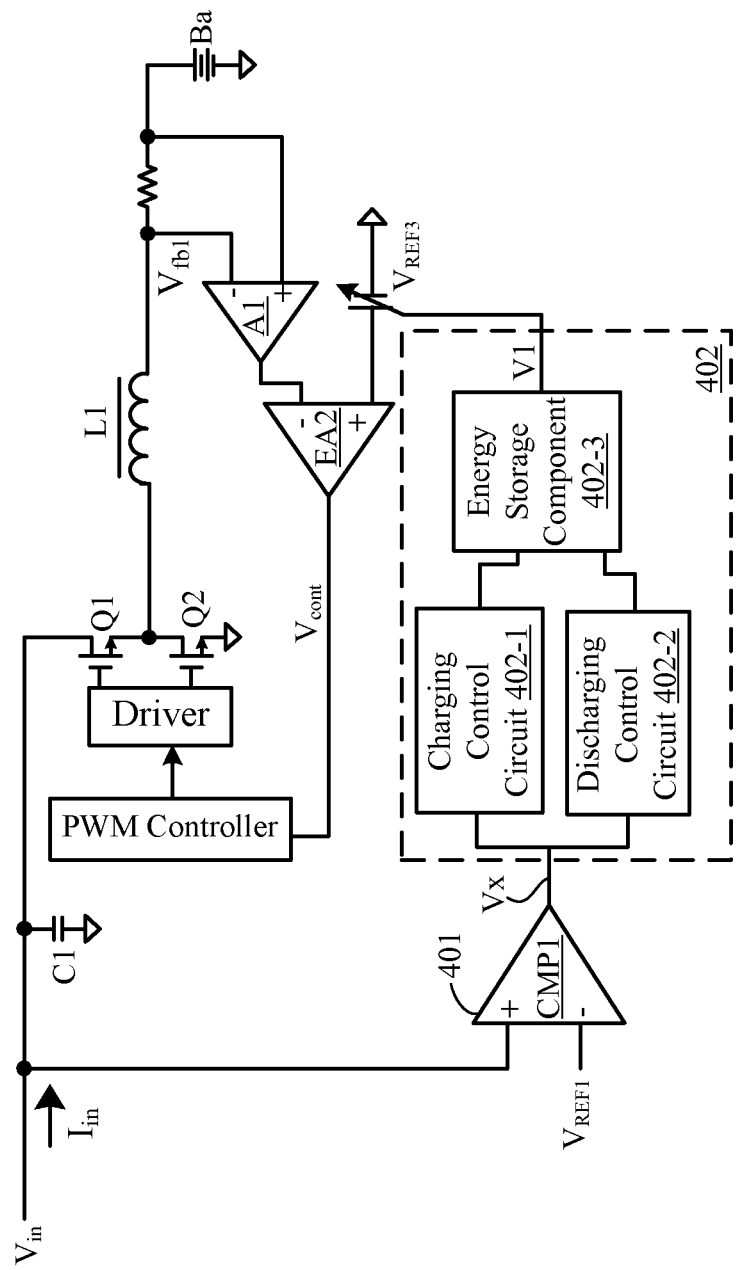
FIG. 4 is a schematic block diagram of a third example self-adaptive input power charger in accordance with embodiments of the present invention.

Referring now to FIG. 4, shown is a schematic block diagram of a third example self-adaptive input power charger in accordance with embodiments of the present invention. In this particular example, comparison circuit 401 can include comparator CMP1 with a non-inverting input terminal that receives input voltage $V_{in}$, an inverting input terminal that receives reference voltage $V_{REF1}$, and an output terminal to output comparison signal Vx as the comparison result.

Current regulation circuit 402 can include charging control circuit 402-1, discharging control circuit 402-2, and energy storage component 402-3. Energy storage component 402-3 can be a capacitor, a battery, or any other suitable storage device or element. Charging control circuit 402-1 can receive comparison signal Vx and a charging power supply, and may control charging of energy storage component 402-3 based on comparison signal Vx. Discharging control circuit 402-2 can receive comparison signal Vx, and may discharge energy storage component 402-3 based on comparison signal Vx. For example, a voltage across energy storage component 402-3 can be configured as control signal V1. In this way, charging and discharging control circuitry can be employed to convert comparison signal Vx into control signal V1 as part of current regulation circuit 402. Various implementations of the charging and discharging control circuitry can be utilized in particular embodiments.

Figure 5:
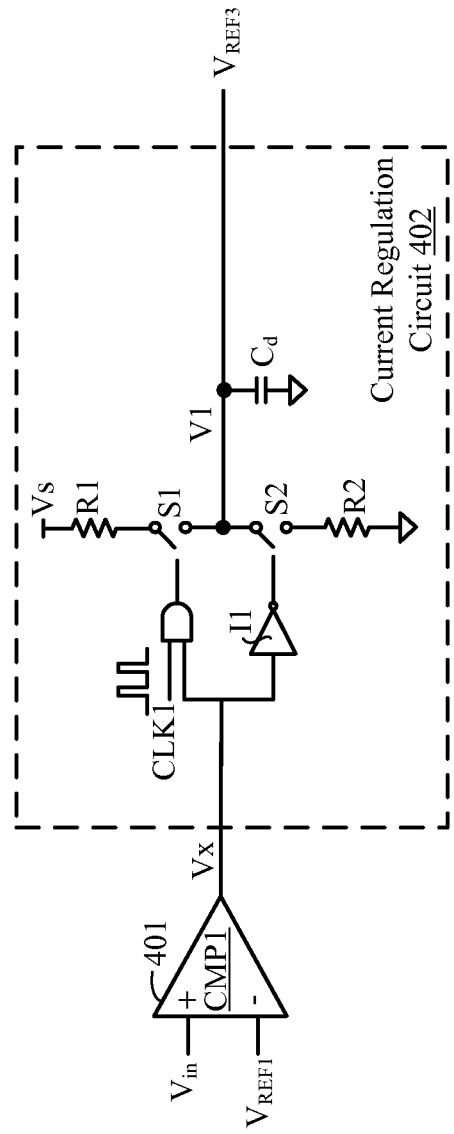
FIG. 5 is a schematic block diagram of a first example current regulation circuit in accordance with embodiments of the present invention.

Referring now to FIG. 5, shown is a schematic block diagram of an example current regulation circuit in accordance with embodiments of the present invention. Here, charging control circuit 402-1 can include voltage source Vs, resistor R1, and switch S1. Discharging control circuit 402-2 can include switch S2 and resistor R2, and energy storage component 402-3 can include capacitor $C_d$. Voltage source Vs can connect to a first terminal of switch S1 through resistor R1. Switch S1 can connect to switch S2 in series, and switch S2 can connect to ground through resistor R2. A first terminal of capacitor $C_d$ can connect to a common node of switches S1 and S2, and a second terminal of capacitor $C_d$ can connect to ground. For example, a voltage across capacitor $C_d$ can be configured as control signal V1, which may also be configured as voltage reference $V_{REF3}$ for the current control loop. Also, switch S1 can be controlled by a signal obtained after an AND logic operation of comparison signal Vx and clock signal CLK1. Switch S2 can be controlled by an inverted version of comparison signal Vx in this example.

The following will describe example input current-limiting and associated control operation in conjunction with FIGS. 4 and 5. When input voltage is less than reference voltage $V_{REF1}$, the input power supply may be detected as being in a current-limiting state. As a result, comparison signal Vx may go low, switch S1 can be turned off, switch S2 can be turned on, and capacitor $C_d$ can be discharged through resistor R2. Therefore, the voltage across capacitor $C_d$ may decrease through the discharge control circuitry. Control signal V1 may decrease as a result, and can be provided to the input terminal of voltage reference $V_{REF3}$ for the current control loop. In other words, control signal V1 can be configured as voltage reference $V_{REF3}$ in this particular case. In other cases, control signal V1 may more indirectly regulate or control a level of voltage reference $V_{REF3}$.

Voltage reference $V_{REF3}$ may correspondingly decrease with control signal the one, and the current control loop can be configured to reduce the charging current of battery Ba. This approach can limit the input current based on detection of a current-limiting state on the input power supply, and may also effectively remove the current-limiting state for a return to normal operation. When input voltage is greater than reference voltage $V_{REF1}$, indicating that the input power supply is not in a current-limiting state, comparison signal Vx may go high, switch S2 can be turned off, when clock signal CLK1 can be high, switch S1 can be turned on, and voltage source Vs can charge capacitor $C_d$ through resistor R1. Thus, the voltage across capacitor $C_d$ may increase, and control signal V1 may accordingly increase.

Control signal V1 can be provided to an input terminal of voltage reference $V_{REF3}$ for the current control loop, and control signal V1 can be configured (directly or indirectly) as voltage reference $V_{REF3}$. Therefore, voltage reference $V_{REF3}$ may correspondingly increase, and the current control loop can be configured to control the charging current of the lithium battery to increase, thus realizing fast charging during normal operation. For example, the charging current may increase up to a maximum current-limiting value as allowed by the input power supply, or the maximum charging current as allowed by the charger. In addition, switch S1 may be turned on only when both of comparison signal Vx and clock signal CLK1 are high. Therefore, increasing speed and step length of voltage reference $V_{REF3}$ can be determined by the period duration and high-pulse width or duty cycle of the clock signal CLK1. Of course, other suitable clock cycles, signals, duty cycles, step lengths, and/or widths for clock signals (e.g., CLK1) can also be used in particular embodiments.

In particular embodiments, it can be determined if the input power supply is in a current-limiting state based on a result of a comparison circuit. The charging current of the charger can be regulated according to the comparison result. When the input power supply is detected as in a current-limiting state, the current regulation loop can decrease the voltage reference (e.g., $V_{REF3}$) for the current control loop to decrease the charging current, and to ensure normal charger operation. When the input power supply is not in a current-limiting state (e.g., normal operation), the current regulation circuit can be configured to increase the voltage reference for the current control loop to increase the charging current/speed. Further, particular embodiments are adaptable to different input power supplies by setting the reference voltage (e.g., $V_{REF1}$) to change the threshold for generating the comparison result.

Figure 6:
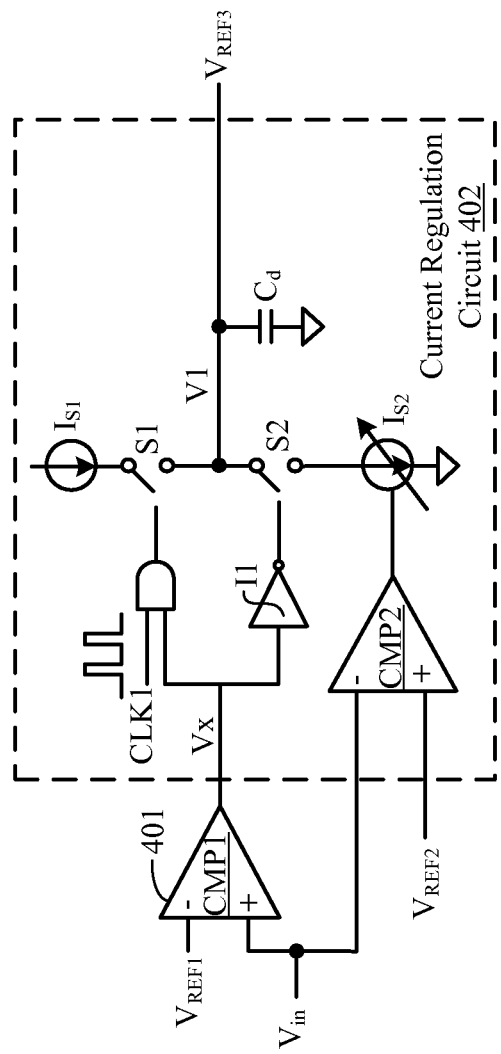
FIG. 6 is a schematic block diagram of a second example current regulation circuit in accordance with embodiments of the present invention.

Referring now to FIG. 6, shown is a schematic block diagram of another example current regulation circuit in accordance with embodiments of the present invention. Energy storage component 402-3 can be configured as capacitor $C_d$, and the structures and operating principles of charging control circuit 402-1 and discharging control circuit 402-2 can be similar to those described above. In this particular example, charging control circuit 402-1 can charge energy storage component 402-3 through current source $I_{S1}$, and discharging control circuit 402-2 can discharge energy storage component 402-3 through current source $I_{S2}$. For example, current source $I_{S2}$ can be an adjustable current source, while current source $I_{S1}$ may be a fixed or stable source.

In addition, discharging control circuit 402-2 can include comparator CMP2 with an inverting input terminal that receives input voltage and a non-inverting input terminal that receives reference voltage $V_{REF2}$, and may generate a comparison signal to regulate discharging current via current source $I_{S2}$. Thus, discharging control circuit 402-2 can control the discharging speed of energy storage component 402-3 based on a comparison signal from comparator CMP2. This example discharging control circuit can also be applied to applications where an input power supply is also used to power a relatively large load. In such cases, the input voltage of the charger can be pulled down instantaneously, and current source $I_{S2}$ can increase the discharging current based on a comparison signal from comparator CMP2. This can make control signal V1 decrease relatively quickly, thus limiting the input current of the charger, and allowing for recovery from the current-limiting state of the input power supply to normal operation of the charger as soon as possible.

In particular embodiments, reference voltages $V_{REF1}$ and $V_{REF2}$ can be regulated in accordance with input voltage $V_{in}$. In one case, reference voltages $V_{REF1}$ and $V_{REF2}$ can be slightly less (e.g., less than a predetermined amount) than the minimum input voltage allowable for normal operation. For example, when the allowable input voltage for normal operation is about 5V, reference voltage $V_{REF1}$ can be set as about 4.75V, and reference voltage $V_{REF2}$ can be set as about 4.4V. Reference voltages $V_{REF1}$ and $V_{REF2}$ can be user programmed and/or set or predetermined in another fashion (e.g., default settings, test or characterization settings, etc.). In some cases, reference voltages $V_{REF1}$ and/or $V_{REF2}$ can be set to a lowest voltage based on the input voltage during a current-limiting state. In any event, a current regulation circuit in particular embodiments can self-regulate the input power supply based on different input voltage thresholds. Also, because no special detection circuit may be needed to detect the type of the input power supply, particular embodiments are adaptive to realize self-adaptive current-limiting protection for a variety of types or specifications of input power supplies.

Figure 7:
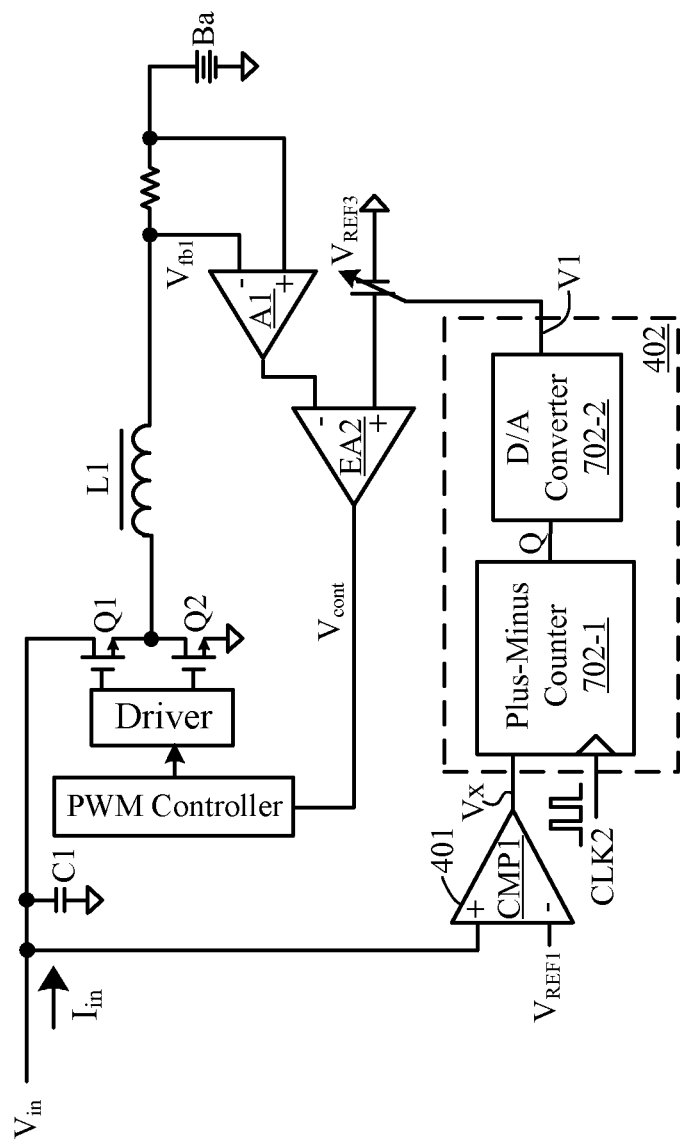
FIG. 7 is a schematic block diagram of a third example current regulation circuit in accordance with embodiments of the present invention.

Referring now to FIG. 7, shown is a schematic block diagram of a third example current regulation circuit accordance with embodiments of the present invention. Current regulation circuit 402 can include plus-minus counter 702-1 and digital-analog converter (DAC) 702-2. Plus-minus counter 702-1 can receive comparison signal Vx and clock signal CLK2, to perform addition or subtraction operations, and to generate digital control signal Q. For example, digital control signal Q may be a bit string signal from 1 to N bits long. Digital-analog converter 702-2 can convert digital control signal Q to an analog control signal that can be configured as control signal V1 and/or voltage reference $V_{REF3}$ for a current control loop of the driving control circuit.

When a high pulse of each clock signal CLK2 arrives, the state of comparison signal Vx can be detected. When the comparison signal Vx is low, plus-minus counter 702-1 can perform a subtraction operation with a certain or predetermined step length. Correspondingly, control signal V1 can be decreased with a certain step (e.g., count by ones, twos, etc.) length, may be provided to an input terminal of the voltage reference for the current control loop, and control signal V1 can be configured (directly or indirectly) as voltage reference $V_{REF3}$.

In this fashion, the current control loop can be configured to reduce the charging current of the lithium battery when and input power supply current-limiting state is detected, and to recover from the current-limiting state to return to normal operation. When comparison signal Vx is high, plus-minus counter 702-1 can perform an addition operation with a certain or predetermined step length. Correspondingly, control signal V1 can increase with a certain or predetermined step length, and the current control loop can be configured to increase the charging current of the lithium battery, thus achieving fast charging during normal operation. Similarly, the charging current can be increased to the allowed maximum current-limiting value of the input power supply or the allowed maximum charging current of the charger.

In this example digital control method of regulating the charging current of the charger, the charger input current can be limited, and problems of the current-limiting state of the input power supply can be substantially avoided. Those skilled in the art will recognize that the current regulation circuit can utilize other control signal arrangements, such as inverted versions of comparison signal Vx as the control signal V1 to alter control signal $V_{cont}$ of the PWM controller. For example, an output signal of inverter I1 in FIG. 6 can be configured as the control signal V1, and the current regulation circuit can provide the control signal V1 to the PWM controller in the driving control circuit. This can control the duty cycle of the power switch (e.g., switch Q1) in the power stage circuit by changing the control signal of the PWM controller, thereby limiting the input current of the charger.

In one embodiment, a method can include: (i) receiving, by a power stage circuit, an external input power supply that supplies an input voltage and an input current to a charger for charging a battery; (ii) generating, by a comparison circuit, a comparison result indicating that the input power supply has entered a current-limiting state when the input voltage is less than a first reference voltage; (iii) generating, by a current regulation circuit, a first control signal in response to the comparison result; and (iv) limiting, by a driving control circuit, the input current using the first control signal.

Figure 8:
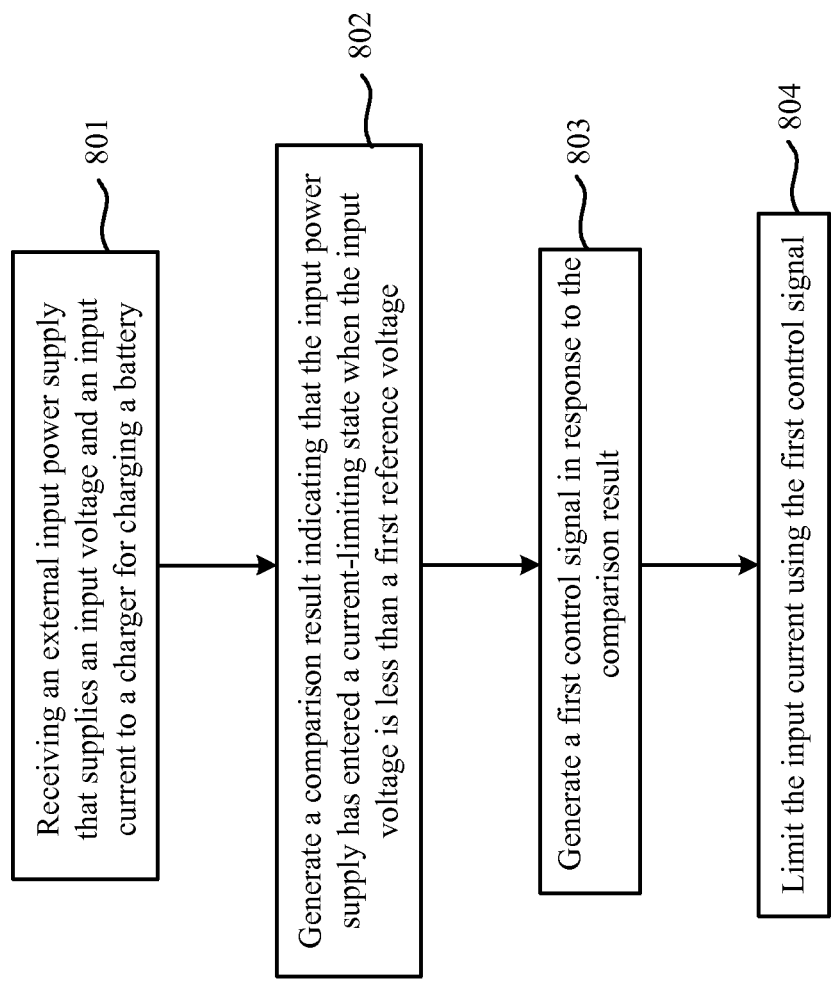
FIG. 8 is a flow diagram of an example method for controlling an input current of a charger, in accordance with embodiments of the present invention.

Referring now to FIG. 8, shown is a flow diagram of an example method for controlling an input current of a charger, in accordance with embodiments of the present invention. At 801, an external input power supply can be received at a power stage or other input of a charger. The input power supply can supply an input voltage and an input current to the charger for charging a battery. At 802, a comparison result (e.g., from an error amplifier, comparator, etc.) indicating that the input power supply has entered a current-limiting state can be generated when the input voltage is less than a first reference voltage.

At 803, when the input voltage is less than the first reference voltage, indicating that the input power supply has entered a current-limiting state, a control signal V1 can be generated or activated in response the comparison result. At 804, the input current of the charger can be limited by using control signal V1. Further, control signal V1 can be provided to a PWM controller in a driving control circuit, and the duty cycle of a power switch (e.g., switch Q1) in the power stage circuit can be controlled via the PWM controller, in order to limit the input current of the charger. Alternatively, or in addition, control signal V1 can be provided to a current control loop in the driving control circuit, and the duty cycle of the power switch in the power stage circuit can be controlled by regulating a voltage reference (e.g., $V_{REF3}$) for the current control loop, in order to limit the input current of the charger.

When the input voltage is greater than the first reference voltage (e.g., $V_{REF1}$), indicating that the power supply is not in the current-limiting state (e.g., in normal operation), control signal V1 can be provided (directly or indirectly) to the current control loop to increase the voltage reference (e.g., $V_{REF3}$) for the current control loop, and to thereby increase the charging current of the charger. This can allow for fast charging times of the battery during normal or non current-limited operation.

Particular embodiments can employ a comparison circuit and current regulation circuit to regulate the input current of the charger, and to reduce the input current of the charger when the input power supply enters a current-limiting state. In this way, the current-limiting state of the input power supply can be recovered from, and the input voltage of the charger can remain operable within a normal range. In addition, particular embodiments can provide a charging current regulating method for a charger, which can increase the charging current to improve the charging speed when the input power is relatively large. The self-adaptive input power charger and method for controlling the input current of the charger of particular embodiments may not need to detect the input current by a sense resistor, and product costs due to associated detection circuitry can be reduced.

Those skilled in the art will recognize that other appropriate techniques, structures, circuit layouts, and/or components, etc, applied to the above examples, can be supported in particular embodiments. Also, charging current-limiting methods and circuits of particular embodiments are not limited to the above mentioned power stage circuits, and can also be applied to any other suitable topology (e.g., Buck topology, Boost topology, Buck-Boost topology, forward topology, flyback topology, half-bridge switching topology, full-bridge switching topology, etc.).

The embodiments were chosen and described in order to best explain the principles of the invention and its practical applications, to thereby enable others skilled in the art to best utilize the invention and various embodiments with modifications as are suited to the particular use contemplated. It is intended that the scope of the invention be defined by the claims appended hereto and their equivalents.

What is claimed is:

1. A self-adaptive input power charger, comprising:
   a) a power stage circuit configured to receive an input voltage and an input current from an external input power supply for charging a battery;
   b) a comparison circuit comprising a first error amplifier configured to receive said input voltage and a first reference voltage, and to generate a comparison result indicating that said input power supply has entered a current-limiting state when said input voltage is less than said first reference voltage;
   c) a current regulation circuit configured to generate a first control signal in response to said comparison result, wherein said current regulation circuit comprises a first diode having a cathode coupled to said comparison result, and an anode coupled to said first control signal; and
   d) a driving control circuit coupled to said anode of said first diode, and being configured to control a duty cycle of a power switch in said power stage circuit based on said first control signal to limit said input current of said charger.

2. The charger of claim 1, wherein said driving control circuit comprises a pulse-width modulation (PWM) controller configured to receive said first control signal, and wherein said duty cycle of said power switch is controlled by said PWM controller.

3. The charger of claim 1, wherein said driving control circuit comprises a current control loop configured to receive said first control signal, and wherein said duty cycle of said power switch is controlled by regulating a voltage reference for said current control loop.

4. The charger of claim 3, wherein said comparison circuit comprises a first comparator configured to receive said input voltage and said first reference voltage, and to generate a first comparison signal as said comparison result.

5. The charger of claim 4, wherein said current regulation circuit is configured to generate said first control signal based on said first comparison signal, and wherein:
   a) when said input voltage is less than said first reference voltage, said first control signal is configured to decrease said voltage reference for said current control loop to limit said input current of said charger; and
   b) when said input voltage is greater than said first reference voltage, said first control signal is configured to increase said voltage reference for said current control loop to increase said input current of said charger.

6. The charger of claim 5, wherein said current regulation circuit comprises:
   a) a charging control circuit configured to receive said first comparison signal and a charging power supply, and to control said charging power supply to charge an energy storage component based on said first comparison signal; and
   b) a discharging control circuit configured to discharge said energy storage component based on said first comparison signal, wherein a voltage across said energy storage component is configured as said first control signal.

7. The charger of claim 6, wherein said discharging control circuit is configured to compare said input voltage against a second reference voltage, and to generate a second comparison signal to control a discharging speed of said energy storage component.

8. The charger of claim 5, wherein said current regulation circuit comprises:
   a) a plus-minus counter configured to receive said first comparison signal and a second clock signal, and to generate a digital control signal; and
   b) a digital-analog converter configured to convert said digital control signal to an analog control signal configured to be transmitted to said current control loop as said first control signal.

9. A method, comprising:
   a) receiving, by a power stage circuit, an input voltage and an input current from an external input power supply for charging a battery;
   b) generating, by a comparison circuit comprising a first error amplifier that receives said input voltage and a first reference voltage, a comparison result indicating that said input power supply has entered a current-limiting state when said input voltage is less than said first reference voltage;

c) generating, by a current regulation circuit, a first control signal in response to said comparison result, wherein said current regulation circuit comprises a first diode having a cathode coupled to said comparison result, and an anode coupled to said first control signal; and d) limiting, by a driving control circuit coupled to said anode of said first diode, said input current by controlling a duty cycle of a power switch in said power stage circuit using said first control signal.

10. The method of claim 9, wherein said generating said comparison result comprises amplifying, by said first error amplifier, an error signal resulting from comparing said input voltage against said first reference voltage.

11. The method of claim 10, further comprising generating said first control signal from said error signal.

12. The method of claim 11, wherein said controlling said duty cycle of said power switch comprises using a pulse-width modulation (PWM) controller.

13. The method of claim 11, wherein said controlling said duty cycle of said power switch comprises regulating a voltage reference for a current control loop.

14. The method of claim 13, wherein said generating said comparison result comprises comparing said input voltage against said first reference voltage, to output a first comparison signal.

15. The method of claim 14, further comprising:

a) generating said first control signal based on said first comparison signal;

b) decreasing said voltage reference for said current control loop to limit said input current of said charger when said input voltage is less than said first reference voltage; and c) increasing said voltage reference for said current control loop to increase said input current of said charger when said input voltage is greater than said first reference voltage.

* * * * *